Patented Aug. 16, 1949

2,479,451

UNITED STATES PATENT OFFICE

2,479,451

POLYTETRAFLUOROETHYLENE BONDED SHAPED ARTICLES

James Hamilton Young, Wilmington, Del., assignor to E. I. du Pont de Nemours & Company, Wilmington, Del., a corporation of Delaware No Drawing. Application November 26, 1946, Serial No. 712,261

7 Claims. (Cl. 252—429)

This invention relates to pellets and tablets and more particularly to pellets and tablets having improved properties.

In carrying out many types of chemical reactions it is necessary to employ solid materials in the form of pellets or tablets, e. g., catalyst pellets to initiate the reaction or to accelerate its rate and tablets of absorbent materials as tower packing. To obtain optimum results in such reactions it is important that the solid material be in a form which provides intimate contact between the solid and the reactants. In one method of doing this, particles of solid materials are formed into pellets which are then placed in the reaction vessel so that the reactants can be passed through the bed of pellets. However, many solid materials, particularly inorganic catalysts and absorbents, cannot be formed into pellets or tablets of the desired shape compact and rigid enough to be capable of retaining their shape during handling and use under reaction conditions, without employing some material as a binder to unite the solid particles in the desired form. The binders which have hitherto been used in forming tablets and pellets, e. g., paraffin waxes, starch, adhesives such as glue, etc., are not completely satisfactory. Some of these binders do not provide pellets of sufficient hardness or strength to be handled, others are not sufficiently chemically inert or stable to heat to permit their use in pellets employed in reactions involving highly reactive chemicals, or relatively high temperatures. Moreover, some binders have a tendency to inhibit the activity of the catalyst, or to reduce the absorbent power of the solid material. In preparing such pellets it is also necessary to include in the composition a material which acts as a lubricant to assist in the removal of the pellet from the die of the pelleting machine. Thus, it is necessary to include in the composition a lubricant such as a fatty acid, a high molecular weight ester, liquid petrolatum, graphite, etc., in addition to the binder. These lubricants may have deleterious effects on the pellets when they are used under critical conditions.

This invention has as an object the production of pellets and tablets having improved properties. Another object is the production of new and useful shaped catalysts in the form of pellets, tablets and the like. A further object is a shaped catalyst having as a binder a material which functions both as a binder and as a lubricant to facilitate removal of the tablet or pellet from the pelleting machine. Further objects are shaped catalysts of this kind which are characterized by great hardness, strength, thermal stability and uniformity. A still further object is a shaped catalyst containing a binding material which in itself exhibits no catalytic or interfering action in any type of chemical reaction.

I have found that pellets and tablets which, by reason of the properties and advantages described herein, are greatly superior to known structures of this type and can be prepared from compositions comprising particles of a solid material and a minor proportion of particles of a solid polymer of tetrafluoroethylene. Pellets and tablets very suitable for use as catalysts in reaction chambers such as converter tubes can be prepared from compositions comprising particles of an inorganic, catalytically active, solid material and finely divided particles of a solid polymer of tetrafluoroethylene. The products of this invention are obtained by uniformly blending the particles of solid material with the particles of polymeric tetrafluoroethylene and forming the composition into pellets or tablets of the desired shape.

A method which is very suitable for preparing pellets of inorganic catalysts consists in uniformly blending a finely divided solid inorganic catalyst with from 1% to 5% of its weight of finely divided solid polytetrafluoroethylene, the polytetrafluoroethylene preferably having a particle size of between 5 and 20 microns, and compressing the resulting composition into pellets of the desired shape and size in conventional pelleting or tableting machines. The polytetrafluoroethylene functions in the dual capacity of a binder and a lubricant. The resulting pellets are easily removed from the pellet die, are compact and rigid, and are not easily broken by handling. These pellets, in addition to the other advantages described herein, are not adversely affected in shape or otherwise by chemicals which would destroy ordinary binders, such as strong acids or bases, or corrosive materials such as chlorine, hydrogen fluoride, etc.

The polytetrafluoroethylene used in the pellets of this invention can be prepared by polymerizing tetrafluoroethylene by known methods, such as, for example, those described in U. S. Patents 2,230,654 and 2,393,967.

The invention is illustrated by the following examples in which proportions of ingredients are expressed in parts by weights unless otherwise specified.

*Example I*

A mixture of 90 parts of aluminum phosphate powder, which has been predried at 400° C., and has a particle size of 8 to 30 mesh (550 to 2400 microns), and 10 parts of polytetrafluoroethylene having a particle size of about 5 to 20 microns, is blended until uniform by tumbling in a closed container. Small portions of the resulting composition are placed in a die having a diameter of 1" and compressed into tablets by means of hydraulic pressure of approximately 190,000 lbs./sq. in. on the surface of the tablet. The resulting discs or tablets are easily ejected from the die and are free from fractures. They are harder than discs of similar shape and size prepared wholly of aluminum phosphate. These pellets are suitable for catalyzing the dehydration of alcohols to produce ethers, e. g. the dehydration of methanol to form dimethyl ether.

*Example II*

The ingredients of Example I are blended uniformly together in the proportions of 75 parts of aluminum phosphate to 25 parts of polytetrafluoroethylene and formed into tablets by the procedure of that example. The resulting tablets are likewise easily ejected from the die and are free from fractures and harder than control tablets containing only aluminum phosphate.

*Example III*

Finely divided chromium fluoride having a particle size of about 60 microns, is formed into a thick paste by the dropwise addition of distilled water to the powder as it is being continually mixed in an efficient mechanical mixer. The paste which is formed is dried at 60° C. for a period of 16–20 hours, and the resulting granular product is forced through an eight mesh sieve to form chromium fluoride particles having a particle size of from 8 to 20 mesh (800 to 2400 microns). A uniform mixture of 100 parts of these chromium fluoride particles with 2 parts of polytetrafluoroethylene having a particle size of from 5 to 20 microns is prepared as in Example I. This mixture is then formed into pellets $\frac{1}{8}$" in diameter in a standard Stokes single punch tablet press. The resulting pellets are easily ejected from the press and are harder and better formed than pellets prepared from the same chromium fluoride particles in the absence of polytetrafluoroethylene. These pellets are suitable for use in catalyzing the reaction between hydrogen fluoride and chlorofluorocarbons such as chlorotrifluoromethane and 1,2-dichloro-1,1,2,2-tetrafluoroethane to form tetrafluoromethane and 1-chloro-1,1,2,2,2-pentafluoroethane, respectively. These catalyst pellets are superior to pellets of chromium fluoride containing carbon black or charcoal which promotes undesirable cleavage of the carbon-carbon bond in compounds of the ethane series.

*Example IV*

Twenty-three parts of polytetrafluoroethylene having a particle size of 5 to 20 microns, is uniformly blended with 2,270 parts of sodium fluoride powder having a particle size of 60 to 100 microns. The resulting composition is formed into pellets of $\frac{1}{16}$" diameter in a standard Stokes single punch tablet press. The pellets are hard and of good quality and are suitable for the removal of hydrogen fluoride from a gas mixture containing it.

Sodium fluoride cannot be pelleted without a binder and lubricant and known binders such as starch or granulated sugar, and known lubricants such as graphite or stearic acid are not satisfactory for use with this material because they are decomposed under the conditions in which the pellets are used, or because they contribute undesirable impurities to the products. The present invention is particularly valuable in the manufacture of sodium fluoride pellets or discs (used as packing in scrubbing towers for removing excess hydrogen fluoride from exit gases coming from converters of various types) because the polymeric tetrafluoroethylene, which serves both as a binder and lubricant, is wholly inert to hydrogen fluoride and is the only material present in the pellet in addition to the sodium fluoride.

The particle size of the solid materials to be formed into pellets or tablets by the process of this invention can vary over wide limits and the optimum size will vary with the particular solid. In general, particles of solid materials having average diameters ranging from 60 to 300 microns can be used. In some cases, e. g., with chromium fluoride, extremely fine particles do not pellet as well as those of the larger sizes within the above range.

The proportions of polytetrafluoroethylene employed in forming the pellets and tablets of this invention can also be varied considerably. However, for economical reasons it is desirable to use the minimum amount of polytetrafluoroethylene which will provide satisfactory lubricating and binding action. Amounts ranging from 0.5% to 50% of the weight of the solid being pelleted can be used. However, amounts ranging from 1% to 5% of the weight of the inorganic solid are generally sufficient. The preferred proportions within these ranges will depend on the particular solid being pelleted.

Th polytetrafluoroethylene and finely divided solid material can be blended together in types of equipment customarily used for mixing powdered solids, and the mixtures can be formed into pellets or tablets of any desired shape or size in any of the conventional pelleting or tableting machines. The compositions of this invention are particularly suitable for pelleting in automatic machines.

While any granular polymeric tetrafluoroethylene can be used in the preparation of the products of this invention it is preferred that the polytetrafluoroethylene be finely divided. Best results are obtained with polytetrafluoroethylene having an average particle size of between 5 and 20 microns. Polytetrafluoroethylene having a particle size suitable for use in the pellets of this invention can be prepared by customary pulverizing methods such as, for example, by comminuting the solid polymer in a ball-mill, hammer-mill, or air-attrition-mill. An air-attrition-mill of the type known commercially as a "Micronizer" is very suitable for producing polytetrafluoroethylene particles having an average size within the range of 5 to 20 microns.

The products of this invention have been described with particular reference to pellets or tablets of aluminum phosphate, chromium fluoride, and sodium fluoride; however, other inorganic or organic solids can be pelleted or tableted with polytetrafluoroethylene. Examples of other catalytically active solids which can be formed into pellets having improved properties by the process of this invention include ruthenium oxide, nickel oxide, aluminum oxide, sodium aluminum silicate, phosphated aluminum hydrate, copper barium chromite, barium chloride, mercury compounds such as basic mercuric nitrate, salts of organic acids such as cobalt naphthalene, etc.

It will be apparent from the foregoing that the pellets and tablets described herein possess unique combination of properties. As has been noted previously the binder contained in these pellets has a combined binding and lubricating action. Because of their hardness, uniformity, and strength, the pellets of this invention are particularly well suited for use in chemical reactions where the reactants must be passed through a bed of pellets packed into converter tubes, absorber towers, or other form of reaction vessel. In such types of apparatus the pellets do not break apart into small pieces and pack so closely together that the reactants cannot be readily passed through the bed. Moreover, because of the high chemical inertness and high heat stability of polytetrafluoroethylene the pellets of catalytically active solids can be used to catalyze reactions at relatively high temperatures and with highly reactive materials. The binder contained in the present pellets also has no tendency in itself to induce catalytic action. It is to be noted that this further advantage of non-interference in all types of catalytic reactions does not necessarily follow from the property of inertness since many highly inert substances are excellent catalysts.

As many apparently widely different embodiments of this invention may be made without departing from the spirit and scope thereof, it is to be understood that I do not limit myself to the specific embodiments thereof except as defined in the appended claims.

I claim:

1. A shaped article in the form of a pellet, tablet and the like which consists essentially of finely divided solid material, and a binder therefor consisting of finely divided particles of polytetrafluoroethylene in amount of from 0.5% to 50% by weight of said finely divided solid material.

2. A shaped catalyst in the form of a pellet, tablet and the like which consists essentially of finely divided solid catalytic material, and a binder therefor consisting of finely divided particles of polytetrafluoroethylene in amount of from 0.5% to 50% by weight of said finely divided catalytic material.

3. A shaped absorbent in the form of a pellet, tablet, and the like which consists essentially of finely divided solid absorbent material, and a binder therefor consisting of finely divided particles of polytetrafluoroethylene in amount of from 0.5% to 50% by weight of said finely divided absorbent material.

4. An article of manufacture which is adapted for use in chemical reactions as a catalyst, absorbent and the like and which comprises granular polytetrafluoroethylene and another finely divided solid material compressed into a pellet, tablet and the like, said granular polytetrafluoroethylene having an average particle size of from 5 to 20 microns and said other finely divided solid material having an average particle size of from 60 to 3000 microns, said polytetrafluoroethylene constituting from 0.5% to 50% by weight of said other finely divided solid material.

5. The shaped article defined in claim 1 in which said finely divided solid material is aluminum phosphate powder.

6. The shaped article defined in claim 1 in which said finely divided solid material is chromium fluoride.

7. The shaped article defined in claim 1 in which said finely divided solid material is sodium fluoride.

JAMES HAMILTON YOUNG.

REFERENCES CITED

The following references are of record in the file of this patent:

UNITED STATES PATENTS

| Number | Name | Date |
|---|---|---|
| 1,371,004 | Slama et al. | Mar. 8, 1921 |
| 1,966,553 | Kropp | July 17, 1934 |
| 2,230,654 | Plunkett | Feb. 4, 1941 |
| 2,392,388 | Joyce | Jan. 8, 1946 |
| 2,393,967 | Brubaker | Feb. 5, 1946 |
| 2,396,629 | Alfthan et al. | Mar. 19, 1946 |
| 2,400,091 | Alfthan | May 14, 1946 |

OTHER REFERENCES

"Teflon," Plastics and Resins, May 1946, pages 14–16.

Certificate of Correction

Patent No. 2,479,451                                            August 16, 1949

JAMES HAMILTON YOUNG

It is hereby certified that errors appear in the printed specification of the above numbered patent requiring correction as follows:

Column 4, line 21, for the numeral "300" read *3000*; column 5, line 2, for the word "naphthalene" read *naphthenate*;

and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*